US011285862B2

(12) United States Patent
Harada et al.

(10) Patent No.: US 11,285,862 B2
(45) Date of Patent: Mar. 29, 2022

(54) VEHICLE LIGHTING DEVICE (71) Applicant: KOITO MANUFACTURING CO., LTD., Tokyo (JP)

(72) Inventors: Hiroyuki Harada, Shizuoka (JP); Keisuke Fujii, Shizuoka (JP)

(73) Assignee: KOITO MANUFACIURING CO., LTD., Tokyo (JP)

( * ) Notice: Subject to any disclaimer, the term of this patent is extended or adjusted under 35 U.S.C. 154(b) by 24 days.

(21) Appl. No.: 16/642,739

(22) PCT Filed: Aug. 30, 2018

(86) PCT No.: PCT/JP2018/032222
§ 371 (c)(1),
(2) Date: Feb. 27, 2020

(87) PCT Pub. No.: WO2019/045007
PCT Pub. Date: Mar. 7, 2019

(65) Prior Publication Data
US 2021/0070389 A1 Mar. 11, 2021

(30) Foreign Application Priority Data

Sep. 1, 2017 (JP) .............................. JP2017-168564
Sep. 1, 2017 (JP) .............................. JP2017-168565
Sep. 1, 2017 (JP) .............................. JP2017-168566

(51) Int. Cl.
*B60Q 1/00* (2006.01)
*F21S 41/24* (2018.01)
(Continued)

(52) U.S. Cl.
CPC ............ *B60Q 1/0005* (2013.01); *B62J 6/04* (2013.01); *B62J 45/41* (2020.02); *B62J 45/42* (2020.02);
(Continued)

(58) Field of Classification Search
CPC ... B62J 45/42; B62J 45/41; B62J 50/16; B62J 6/04; F21S 41/24; F21S 41/50;
(Continued)

(56) References Cited

U.S. PATENT DOCUMENTS 5,384,693 A 1/1995 Schwaller et al.
2005/0122729 A1 6/2005 Katagiri
(Continued)

FOREIGN PATENT DOCUMENTS

GB 1475058 A 6/1977
JP 5-20905 A 1/1993
(Continued)

OTHER PUBLICATIONS

English translation of JP 2017-039487. Feb. 23, 2017. (Year: 2017).*

(Continued)

*Primary Examiner* — Laura K Tso
(74) *Attorney, Agent, or Firm* — Sughrue Mion, PLLC (57) ABSTRACT

Provided is a vehicular lighting device (1) attached to a motorbike (100) that is capable of traveling around corners due to the vehicle body being tilted toward the direction for turning, wherein the vehicular lighting device (1) comprises at least two lamps and a sensor (7) for detecting the surrounding environment toward the rear of the vehicle. The vehicular lighting device (1) comprises a left lighting unit (2L) and a right lighting unit (2R) as the at least two lamps. The sensor (7) is disposed between the left lighting unit (2L) and the right lighting unit (2R) as viewed from rearward of the vehicle.

17 Claims, 8 Drawing Sheets

(51) Int. Cl.
*F21S 43/50* (2018.01)
*F21S 41/50* (2018.01)
*F21S 43/235* (2018.01)
*B62J 50/16* (2020.01)
*B62J 45/41* (2020.01)
*B62J 45/42* (2020.01)
*B62J 6/04* (2020.01)
*F21W 107/17* (2018.01)

(52) U.S. Cl.
CPC ............... *B62J 50/16* (2020.02); *F21S 41/24* (2018.01); *F21S 41/50* (2018.01); *F21S 43/235* (2018.01); *F21S 43/50* (2018.01); *F21W 2107/17* (2018.01)

(58) Field of Classification Search
CPC .... F21S 43/50; F21S 43/235; F21W 2107/17; B60S 1/56; B60S 1/0848
USPC ................................................... 362/544, 473
See application file for complete search history.

(56) References Cited

U.S. PATENT DOCUMENTS

| | | | | |
|---|---|---|---|---|
| 2014/0060582 A1* | 3/2014 | Hartranft | ................ | B60S 1/528 134/18 |
| 2015/0197299 A1* | 7/2015 | Lee | .......... | B62J 11/00 280/288.4 |
| 2015/0344001 A1* | 12/2015 | Lopez Galera | ........... | B60S 1/56 134/198 |
| 2017/0355300 A1 | 12/2017 | Kurata | | |
| 2018/0050752 A1* | 2/2018 | Wang | ....................... | B62M 6/90 |
| 2018/0148116 A1* | 5/2018 | Kurata | ....................... | B62J 6/04 |
| 2021/0053642 A1* | 2/2021 | Kuroba | .................... | B62J 17/04 |

FOREIGN PATENT DOCUMENTS

| | | |
|---|---|---|
| JP | 2000-236462 A | 8/2000 |
| JP | 2001-151016 A | 6/2001 |
| JP | 2005-119374 A | 5/2005 |
| JP | 2016-187990 A | 11/2016 |
| JP | 2017-39487 A | 2/2017 |
| JP | 2017-132278 A | 8/2017 |
| JP | 2017-218133 A | 12/2017 |
| WO | WO-2015067403 A1 * 5/2015 | ............. B62J 27/00 |

OTHER PUBLICATIONS

Translation of WO 2015/067403 A1. (Year: 2021).*
Communication dated Jul. 3, 2020, from the State Intellectual Property Office of People's Republic of China in counterpart Application No. 201810996597.8.
International Search Report (PCT/ISA/210) dated Dec. 4, 2018 issued by the International Searching Authority in International Application No. PCT/JP2018/032222.
Written Opinion (PCT/ISA/237) dated Dec. 4, 2018 issued by the International Searching Authority in International Application No. PCT/JP2018/032222.
Communication dated Jan. 11, 2021 issued by the State Intellectual Property Office of the P.R.China in application No. 201810996597.8.

* cited by examiner

VEHICLE LIGHTING DEVICE

TECHNICAL FIELD

The present invention relates to a vehicle lighting device.

BACKGROUND ART

A tail lamp for an automatic two-wheel vehicle has been disclosed in Patent Literature 1 and the like.

CITATION LIST

Patent Literature

Patent Literature 1: JP-A-5-20905

SUMMARY OF INVENTION

Technical Problem

Inventors have considered to use a sensor, which detects a surrounding environment for presence or absence of a following vehicle and the like, in a vehicle such as an automatic two-wheel vehicle. The inventors have particularly studied how to preferably dispose the sensor in a rear portion of the vehicle.

A first object of the present disclosure is to provide a vehicle lighting device that includes a sensor of a preferred disposition.

In addition, there is a possibility that the sensor is stained by dust or dirt adhering to a surface of the sensor. If the stain on the surface of the sensor is neglected, a problem occurs that an appropriate detection cannot be performed.

Therefore, a second object of the present disclosure is to provide a vehicle lighting device that prevents a sensor mounted on a vehicle from being stained.

Solution to Problem

In order to achieve the first object described above, a vehicle lighting device according to one aspect of the present disclosure is a vehicle lighting device that is to be attached to a vehicle capable of traveling at a corner by tilting a vehicle body thereof toward a turning direction, which includes:

at least two lamps, and a sensor configured to detect a surrounding environment behind the vehicle, in which the sensor is disposed between the at least two lamps as viewed from a rear side of the vehicle.

According to the configuration described above, as a preferred disposition of the sensor, the sensor is disposed between the two lamps.

In order to achieve the first object, in the vehicle lighting device according to one aspect of the present disclosure, the sensor may be disposed in a rear of the vehicle compared to the at least two lamps.

According to the configuration described above, since the sensor is disposed in a rear of the vehicle compared to the lamp, light of the lamp does not enter the sensor, and erroneous detection of the sensor due to the light of the lamp can be prevented.

Further, the sensor may be disposed such that a traveling wind of the vehicle passes at least one of an upper side, a lower side, a left side, and a right side of the sensor.

According to the configuration described above, since the traveling wind passes at least one of the upper side, the lower side, the left side, and the right side of the sensor as the vehicle travels, it is possible to prevent dust or dirt from flowing to a side surface of the sensor.

Further, a gap through which the traveling wind of the vehicle passes may be formed between the sensor and at least one of the at least two lamps.

According to the configuration described above, since the traveling wind passes through the gap as the vehicle travels, it is possible to prevent dust or dirt from flowing to a gap side of the sensor or to at least one of gap sides of the two lamps.

Further, in order to achieve the first object, a vehicle lighting device according to one aspect of the present disclosure is a vehicle lighting device that is to be attached to a vehicle capable of traveling at a corner by tilting a vehicle body thereof toward a turning direction, in which at least two sensors configured to detect a surrounding environment behind the vehicle are mounted, and the at least two sensors are disposed symmetrically with respect to a traveling direction of the vehicle at a time of traveling straight ahead.

According to the configuration described above, as a preferred disposition, the sensors are disposed symmetrically with respect to the traveling direction of the vehicle at the time of traveling straight ahead. With this disposition, processing of detection data acquired from the sensors is made easy.

Further, in the vehicle lighting device according to one aspect of the present disclosure, the sensors may be two LiDAR.

According to the configuration described above, information on the surrounding environment behind the vehicle can be detected by the two LiDAR.

Further, the sensors may be two cameras.

According to the configuration described above, information on the surrounding environment behind the vehicle can be detected by the two cameras.

Further, in order to achieve the second object, a vehicle lighting device according to one aspect of the present disclosure is a vehicle lighting device that is to be attached to a vehicle capable of traveling at a corner by tilting a vehicle body thereof toward a turning direction, and that includes a sensor configured to detect a surrounding environment behind a vehicle, in which components of the vehicle lighting device including the sensor are disposed such that a traveling wind of the vehicle passes around a detection surface of the sensor.

According to the configuration described above, since the components of the vehicle lighting device including the sensor are disposed such that the traveling wind of the vehicle passes around the detection surface of the sensor, it is possible to prevent dust or dirt from flowing to a sensor surface.

Further, in the vehicle lighting device according to one aspect of the present disclosure, the sensor may be disposed at a predetermined distance from the components excluding the sensor.

According to the configuration described above, since the sensor is disposed at a predetermined distance from the components excluding the sensor, the traveling wind of the vehicle passes around the detection surface of the sensor, that is, passes between the sensor and the components excluding the sensor, it is possible to prevent dust or dirt from flowing to the detection surface of the sensor.

Further, a cleaner may be provided to eject a cleaning medium onto the detection surface of the sensor.

According to the configuration described above, stains on the detection surface of the sensor can be cleaned by the cleaner configured to eject the cleaning medium onto the detection surface of the sensor.

Advantageous Effects of Invention

In the vehicle lighting device according to one aspect of the present disclosure, the sensor is disposed between two lamps as a preferred disposition of the sensor.

Further, according to the vehicle lighting device according to one aspect of the present disclosure, as a preferred disposition of the sensors, the sensors mounted on the vehicle lighting device are disposed symmetrically with respect to the traveling direction of the vehicle at a time of traveling straight ahead. With this disposition, processing of detection data acquired from the sensors is made easy.

Further, according to the vehicle lighting device according to one aspect of the present disclosure, it is possible to prevent the sensor surface from being stained.

DESCRIPTION OF EMBODIMENTS

Hereinafter, embodiments of the present disclosure will be described with reference to the drawings. In the description of the present embodiment, a "left-right direction", a "front-rear direction", and an "up-down direction" are relative directions set for convenience of description of a vehicle illustrated in FIG. 1. Here, the "up-down direction" includes an "upward direction" and a "downward direction". The "front-rear direction" includes a "forward direction" and a "rearward direction". The "left-right direction" includes a "leftward direction" and a "rightward direction".

Figure 1:
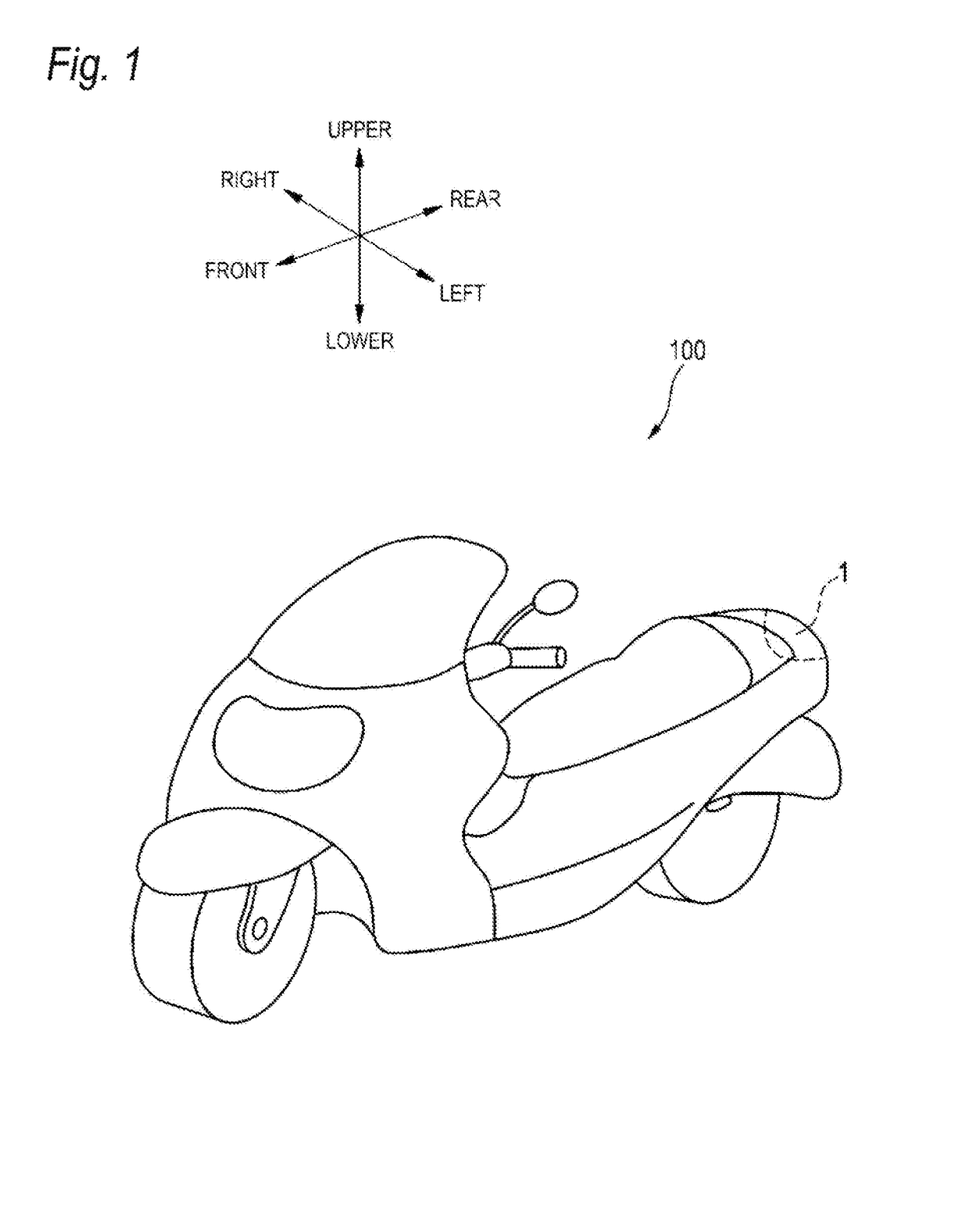
FIG. 1 is a diagram illustrating a position of a vehicle lighting device in a vehicle.

FIG. 1 illustrates an automatic two-wheel vehicle 100 as an example of a vehicle according to the present embodiment. The automatic two-wheel vehicle 100 is a vehicle capable of traveling at a corner of a road by tilting a vehicle body thereof toward a turning direction. Here, the corner of the road includes a curve of the road. The vehicle of the present embodiment may be any vehicle that is capable of traveling at a corner by tilting the vehicle body toward a turning direction, such as the automatic two-wheel vehicle 100, and the number of wheels is not limited. Therefore, for example, an automatic three-wheel vehicle or an automatic four-wheel vehicle is included in the vehicle of the present embodiment as long as the vehicle is capable of traveling similarly to the automatic two-wheel vehicle 100.

As illustrated in FIG. 1, a vehicle lighting device 1 is provided in a rear portion of the automatic two-wheel vehicle 100. The vehicle lighting device 1 in this example is a rear combination lamp (an example of the vehicle lighting device) capable of illuminating a rear side of the vehicle.

Figure 2:
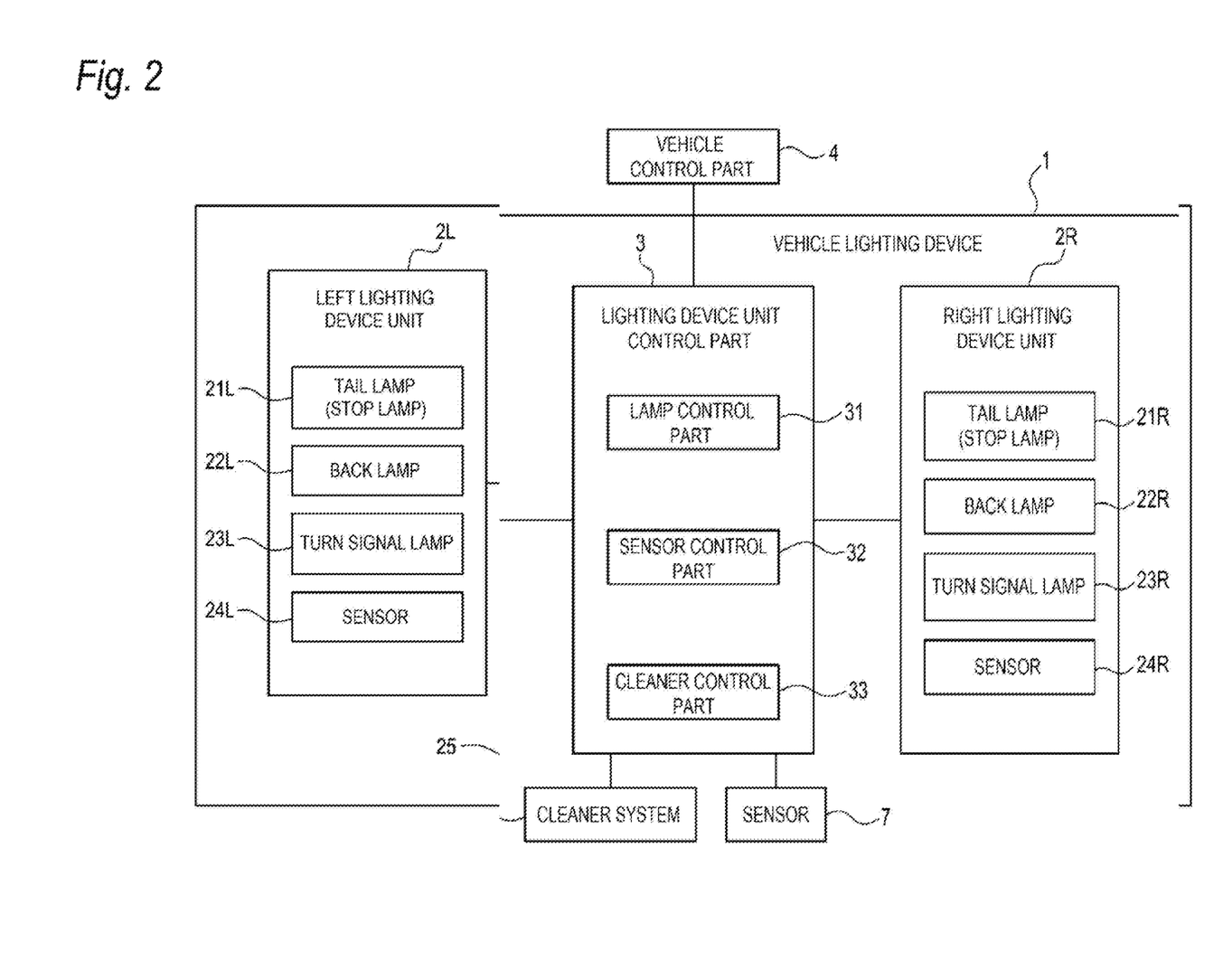
FIG. 2 is a block diagram illustrating a vehicle lighting device.

An outline of the vehicle lighting device 1 will be described with reference to FIG. 2. FIG. 2 is a block diagram illustrating the vehicle lighting device 1. As illustrated in FIG. 2, the vehicle lighting device t includes a left lighting device unit 2L, a right lighting device unit 2R, a lighting device unit control part 3 that controls both the left lighting device unit 2L and the right lighting device unit 2R, a sensor 7, and a cleaner system 25.

The left lighting device unit 2L is provided at a left portion of the rear portion of the automatic two-wheel vehicle 100, and the right lighting device unit 2R is provided at a right portion of the rear portion of the automatic two-wheel vehicle 100. The left lighting device unit 2L includes, on the left, a tail lamp 21L, a back lamp 22L, a turn signal lamp 23L, and a sensor 24L. The right lighting device unit 2R includes, on the right, a tail lamp 21R, a back lamp 22R, a turn signal lamp 23R, and a sensor 24R. The tail lamp is also used as a stop lamp. The left lighting device unit 2L and the right lighting device unit 2R may have similar configurations. Note that, hereinafter, the tail lamps 21L and 21R, the back lamps 22L and 22R, and the turn signal lamps 23L and 23R will be simply referred to as "lamps" in description thereof.

The sensor 7 is configured with at least one of, for example, light detection and ranging or laser imaging detection and ranging (a LiDAR), a camera and a radar. The cleaner system 25 will be described below.

Here, LiDAR is an abbreviation for light detection and ranging or laser imaging detection and ranging. The LiDAR is a sensor that generally emits invisible light to a front side, and based on the emitted light and returned light, acquires information such as a distance to an object, a shape of the object, a material of the object and a color of the object.

The camera is, for example, a camera including an imaging element such as a charge-coupled device (a CCD) and a complementary MOS (a CMOS). The camera is a camera that detects visible light or an infrared camera that detects infrared rays.

The radar is a millimeter wave radar, a microwave radar, a laser radar, or the like.

The lighting device unit control part 3 includes a lamp control part 31, a sensor control part 32, and a cleaner control part 33. The lamp control part 31 is configured to control the tail lamps 21L and 21R, the back lamps 22L and 22R, and the turn signal lamps 23L and 23R, which are left and right lamps. The sensor control part 32 is configured to control the sensor 7 and the left and right sensors 24L and 24R. The cleaner control part 33 is configured to control the cleaner system 25.

The lighting device unit control part 3 is connected to a vehicle control part 4 that controls the automatic two-wheel vehicle 100.

<Disposition of Lamps and Sensors>

Figure 3:
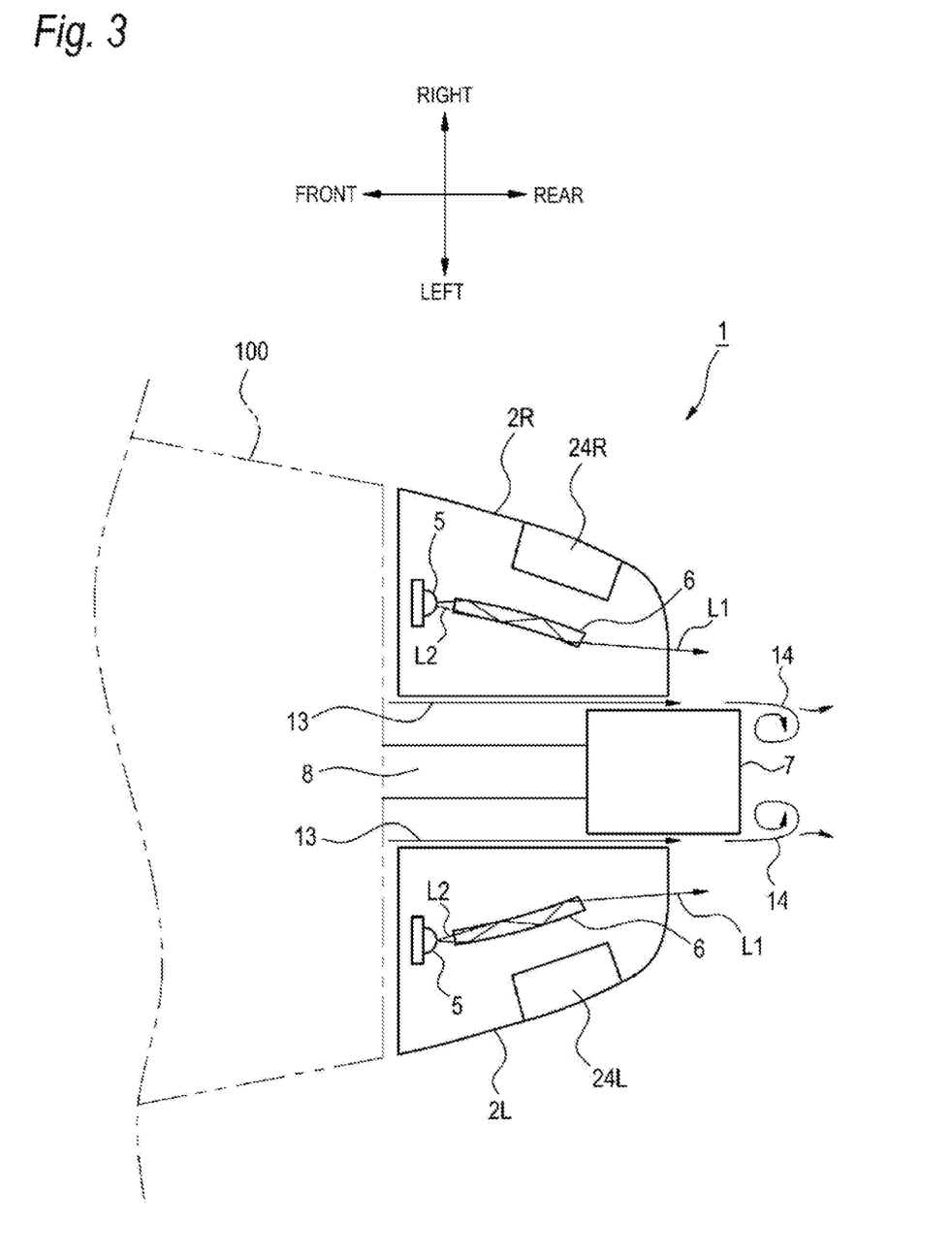
FIG. 3 is a schematic diagram illustrating a vehicle lighting device.

Next, disposition of the left and right lighting device units 2L and 2R, which are lamps, will be described in detail with reference to FIG. 3. FIG. 3 is a schematic diagram illustrating the vehicle lighting device 1. As illustrated in FIG. 3, the left lighting device unit 2L and the right lighting device unit 2R of the vehicle lighting device 1 are disposed symmetrically with respect to a traveling direction of the automatic two-wheel vehicle 100 at the time of traveling straight ahead. Here, the traveling direction of the automatic two-wheel vehicle 100 at the time of traveling straight ahead refers to a traveling direction in a case where the automatic two-wheel vehicle 100 travels on a straight line. The front-rear direction of the automatic two-wheel vehicle 100 illustrated in FIG. 3 coincides with the traveling direction of the automatic two-wheel vehicle 100 at the time of traveling straight ahead.

The sensor 7 is disposed between the left lighting device unit 2L and the right lighting device unit 2R. The sensor 7 is fixed to the automatic two-wheel vehicle 100 via a support portion 8. As illustrated in FIG. 3, at least a part of the sensor 7 is disposed at a position rearward than the left lighting device unit 2L and the right lighting device unit 2R in the traveling direction of the automatic two-wheel vehicle 100 at the time of traveling straight ahead, as viewed from a rear side (a rearward direction in FIG. 3) of the automatic two-wheel vehicle 100.

The sensor 7 is a sensor capable of acquiring information on an outside of an own vehicle including a surrounding environment of the automatic two-wheel vehicle 100. The surrounding environment includes, for example, obstacles, other vehicles, pedestrians, road shapes, and triflic signs, and the like. Other vehicles include a preceding vehicle, an oncoming vehicle, and a following vehicle. The sensor 7 is configured to output the acquired information to the sensor control part 32. Similarly to the sensors 24L and 24R, the sensor 7 is configured with at least one of, for example, a LiDAR, a camera, and a radar.

Although not illustrated, sensors that acquire information on the own vehicle including a traveling state of the automatic two-wheel vehicle 100, such as a bank angle sensor that detects a tilt state of the automatic two-wheel vehicle 100 and a speed sensor that detects a speed of the automatic two-wheel vehicle 100, are mounted on the automatic two-wheel vehicle 100. Each piece of information detected by the sensor (not illustrated) is transmitted to the vehicle control part 4. The vehicle control part 4 is configured to control operations of the vehicle lighting device 1 based on information transmitted from each sensor (not illustrated) and from the lighting device unit control part 3.

Next, control of the vehicle lighting device 1 will be described.

The vehicle control part 4 controls the vehicle lighting device 1 in accordance with a rider's input operation on the automatic two-wheel vehicle 100 and in accordance with a traveling control state of the automatic two-wheel vehicle 100. Note that, hereinafter, the rider is also referred to as a driver. The sensors 7, 24L, and 24R detect information on a periphery of the automatic two-wheel vehicle 100, and transmit a signal relating to a detection result thereof to the vehicle control part 4. The vehicle control part 4 may control the vehicle lighting device 1 in accordance with the information on the periphery and received from the sensors 7, 24L, and 24R. Alternatively, the vehicle control part 4 transmits, to the lamp control part 31, a signal for instructing to turn on the tail lamps 21L and 21R or a signal for instructing to change a light emission intensity, based on a braking operation of the rider on the automatic two-wheel vehicle 100. The lamp control part 31 receives the signal for turning on the tail lamps 21L and 21R, and turns on the tail lamps 21 and 21R. Alternatively, the lamp control part 31 changes the light emission intensity of the tail lamps 21L and 21R.

The lamp control part 31 may perform lighting control of the tail lamps 21L and 21R in accordance with the detection result of the information on the periphery of the automatic two-wheel vehicle 100 which is received from the sensors 7, 24L, and 24R.

In an automatic two-wheel vehicle in the related art, various lamps are disposed at a rear portion of the vehicle. Although there is a limited space for disposing the lamps at the rear portion of the vehicle, a sensor may be desired to be disposed in this space. Therefore, it is necessary to consider a disposition in which the limited space is effectively used.

That is, as a result of various studies on a preferred disposition of the left and right lighting device units 2L and 2R and the sensor 7, the inventors of the vehicle lighting device 1 of the present disclosure have found that the limited space at the rear portion of the vehicle can be effectively utilized by disposing the left lighting device unit 2L and the right lighting device unit 2R symmetrically with respect to the traveling direction of the automatic two-wheel vehicle 100 at the time of traveling straight ahead, and/or by disposing the sensor 7 between the left lighting device unit 2L and the right lighting device unit 2R.

A rear surface of the sensor 7 is a detection surface. With respect to the detection surface of the sensor 7, the detection surface of the sensor 7 is disposed reward than one of the left lighting device unit 2L and the right lighting device unit 2R in the rear portion of the automatic two-wheel vehicle 100. In this example, the detection surface of the sensor 7 is disposed to be rearward than the left lighting device unit 2L and the right lighting device unit 2R in the rear portion of the automatic two-wheel vehicle 100.

With this configuration, light of the left and right lighting device units 2L and 2R does not enter the detection surface of the sensor 7, and erroneous detection of the sensor 7 due to the light of the left and right lighting device units 2L and 2R can be prevented.

<Sensors Mounted on Left and Right Lighting Device Units>

Figure 4:
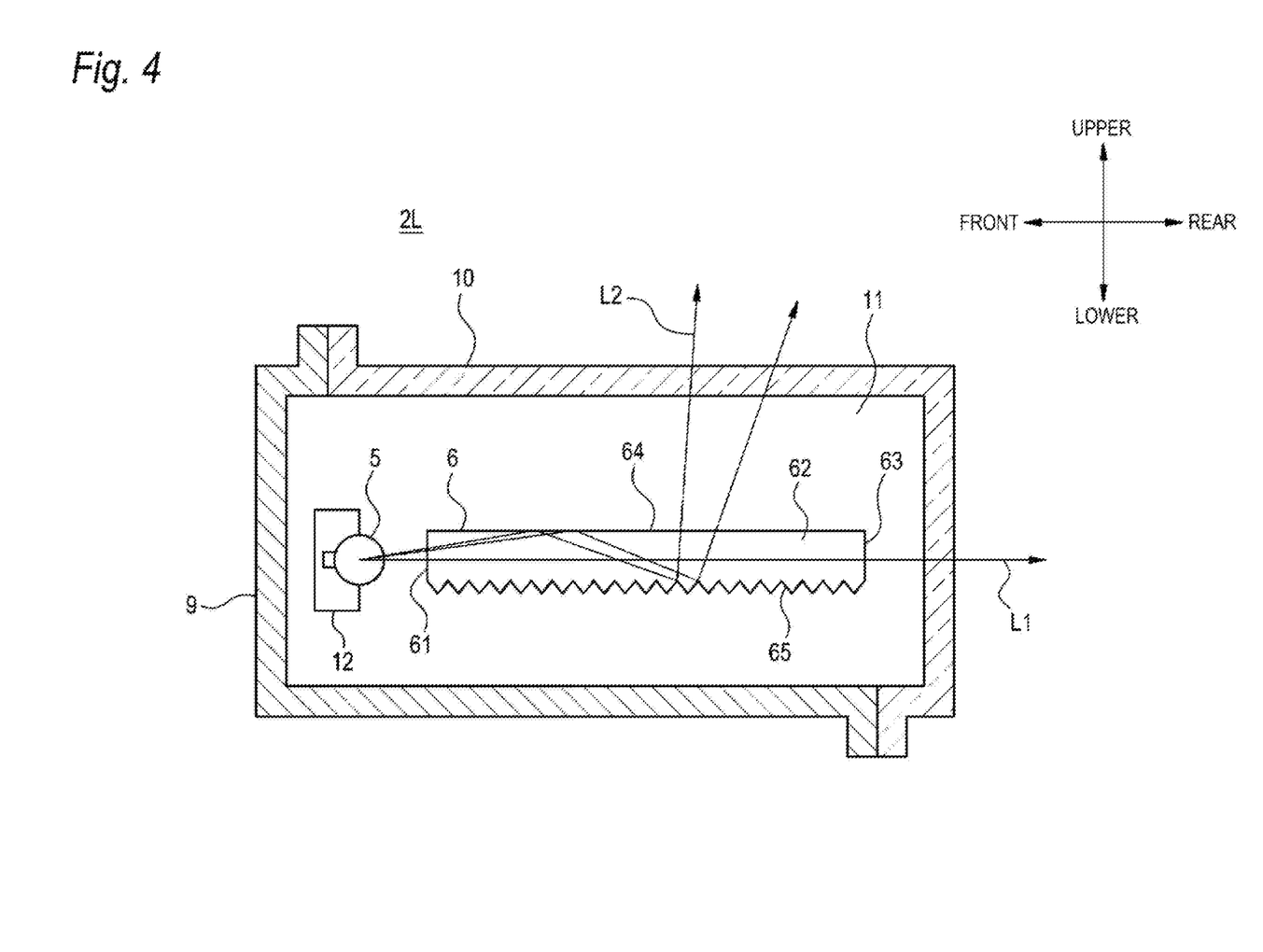
FIG. 4 is a schematic diagram illustrating a configuration of a left lighting device unit.

Next, an internal configuration of the left and right lighting device units 2L and 2R will be described with reference to FIGS. 3 and 4. FIG. 4 schematically illustrates the configuration of the left lighting device unit 2L. The left and right lighting device units 2L and 2R each have a symmetrical internal configuration.

As illustrated in FIG. 4, the left lighting device unit 2L includes a housing 9 and a translucent cover 10. The housing 9 and the translucent cover 10 define a lamp chamber 11. As illustrated in FIGS. 3 and 4, at least one light source 5, a light guide body 6, and a sensor 24L are disposed in the lamp chamber 11. Here, the light guide body 6 is an example of an optical member.

As illustrated in FIG. 3, the sensor 24L mounted on the left lighting device unit 2L and the sensor 24R mounted on the right lighting device unit 2R are disposed symmetrically with respect to the traveling direction of the automatic two-wheel vehicle 100 at the time of traveling straight ahead. Here, being mounted on the left and right lighting device unit 2L and 2R refers to that the sensors 24L and 24R may be incorporated in the lamp chambers 11 of the lighting device units 2L and 2R, and may be disposed in the vicinity of the lighting device units 2L and 2R outside the lamp chambers 1 of the lighting device units 2L and 2R.

As illustrated in FIG. 3, the sensors 24L and 24R of the left and right lighting device units 2L and 2R are provided at positions that do not interfere with a light path of the light emitted from the light source 5. As illustrated in FIGS. 3 and 4, a part of the light incident on the light guide body 6 from the light source 5 is emitted in a light path L1 to a rear side of the automatic two-wheel vehicle 100, and another part of the light incident into the light guide body 6 from the light source 5 is emitted in a light path L2 to an upper side of the automatic two-wheel vehicle 100. The sensors 24L and 24R are disposed at positions deviated from the light paths L1 and L2 of the light emitted from the light guide body 6.

An automatic two-wheel vehicle in the related art includes a lamp at a rear portion of the vehicle, as a configuration corresponding to the vehicle lighting device 1 of the present disclosure. In the automatic two-wheel vehicle in the related art, a light source and the like of the lamp are disposed inside the lamp at the rear portion of the vehicle. A space inside the lamp and a space in the vicinity of the lamp are limited. However, there is a case where a sensor is desired to be disposed in the space inside the lamp and in the space in the vicinity of the lamp. Therefore, it is necessary to consider a disposition in which the limited space is effectively used.

That is, as a result of various studies on a preferred disposition of the sensors 24L and 24R mounted on the left and right lighting device units 2L and 2R, the inventors of the vehicle lighting device 1 of the present disclosure have found that the limited space of the vehicle lighting device 1 can be effectively utilized by disposing the sensors 24L and 24R at symmetrical positions with respect to the traveling direction of the automatic two-wheel vehicle 100 at the time of traveling straight ahead. Further, according to the disposition of the sensors 24L and 24R, detection data acquired from the sensors 24L and 24R is data detected at symmetrical positions. Therefore, it is made easy to process the detection data in the sensor control part 32.

Each of the sensors 24L and 24R may include at least one of a LiDAR, a camera, a radar, and the like. That is, the sensor 24L may be a LiDAR or a camera. The sensor 24L may be configured with a plurality of types of sensors, or a plurality of sensors of the same type. The sensor 24R can be configured similarly to the sensor 24L.

One of the sensors 24L and 24R may be a LiDAR, and the other may be a camera. As described, even when the sensors 24L and 24R are different types of sensors, the sensors 24L and 24R are disposed symmetrically with respect to the traveling direction of the automatic two-wheel vehicle 100 at the time of traveling straight ahead.

As an example, a case where the sensors 24L and 24R each are configured with 2 LiDAR will be described. For example, a detection range of the LiDAR is 120 degrees. The sensors 24L and 24R may each have a detection range of up to 240 degrees in a horizontal plane of the sensors 24L and 24R. For example, the rear portion of the automatic two-wheel vehicle 100 is a region where detection accuracy is desired to be further increased. Therefore, directions of the sensors 24L and 24R in the rear portion of the automatic two-wheel vehicle 100 may be set such that the detection ranges of the sensors overlap.

For example, taking a front portion of the automatic two-wheel vehicle 100 as a criteria, the detection ranges of the left and right sensors 24L and 24R can be set symmetrically, and the detection ranges of the sensors 24L and 24R can be set so as to overlap each other by 120 degrees in the rear portion of the automatic two-wheel vehicle 100.

In a case where the sensors 24L and 24R are each configured with 2 cameras, a detection range of each camera can be set similarly to the sensors 24L and 24R each configured with 2 LiDAR.

According to the example of the sensors 24L and 24R each configured with 2 LiDAR or the example of the sensors 24L and 24R each configured with 2 cameras, by setting the detection ranges of the sensors 24L and 24R, all directions of 360 degrees in the horizontal plane of the sensors 24L and 24R can be detected, and a range particularly desired to be detected can be more accurately detected.

<Vehicle Lighting Device Having Optical Member Emitting Light to Rear Side of Vehicle and Upper Side of Vehicle>

Next, a vehicle lighting device having an optical member that emits light to a rear side and an upper side of the vehicle will be described. Here, in this example, the vehicle is the automatic two-wheel vehicle 100 on which the vehicle lighting device 1 is mounted.

As illustrated in FIG. 4, the left lighting device unit 2L includes the light source 5, and a light guide body 6 that guides light, which is emitted from the light source 5, to the rear side of the vehicle and to the upper side of the vehicle. The light guide body 6 is an example of the optical member. Since the left and right lighting device units 2L and 2R have symmetrical configurations, the configuration of the left lighting device unit 2L will be described below, and a description of the right lighting device unit 2R will be omitted.

As illustrated in FIGS. 3 and 4, the light source 5 is disposed on a front side of the lamp chamber 11. The light source 5 emits light for illuminating a predetermined region.

A lamp light source or a light emitting element can be used as the light source 5. Examples of the lamp light source include an incandescent lamp, a halogen lamp, a discharge lamp, a neon lamp and the like. Examples of the light emitting element include a light emitting diode, a laser diode, an organic EL element and the like.

The light guide body 6 is a member that causes light, which is emitted from the light source 5, to be guided to the rear side and to the upper side of the automatic two-wheel vehicle 100. As illustrated in FIG. 4, the light guide body 6 includes an incidence surface 61, a main body portion 62, emitting surfaces 63 and 64, and a reflection portion 65. The incidence surface 61 is an end surface of the light guide body 6 on which light emitted from the light source 5 is incident when the light source 5 is turned on. The main body portion 62 is formed in an elongated shape, and is configured to guide the light incident from the light source 5 to the emitting surfaces 63 and 64. The emitting surfaces 63 and 64 are surfaces from which the light incident from the incidence surface 61 and guided to the main body portion 62 is emitted.

The emitting surface 63 is a first region through which the light is emitted to the rear side of the automatic two-wheel vehicle 100. The emitting surface 64 is a second region for emitting the light toward the upper side of the automatic two-wheel vehicle 100.

The reflection portion 65 is configured with a plurality of step differences having an angle for reflecting light, which is incident into the main body portion 62 and guided inside the main body portion 62, toward an upper side of the main body portion 62. Hereinafter, the step difference is also referred to as a step.

Next, light emission in the left lighting device unit 2L illustrated in FIG. 4 will be described.

The lamp control part 31 (see FIG. 2) performs lighting control of the light source 5 of the left lighting device unit 2L.

The light emitted from the light source 5 is incident on the incidence surface 61 of the light guide body 6 and is guided inside the main body portion 62. At this time, a part of the light incident into the main body portion 62 from the light source 5 is directly reflected toward the emitting surface 63 or is totally reflected inside the main body portion 62 toward the emitting surface 63, and is emitted from the emitting surface 63 toward the rear side. The light emitted from the emitting surface 63 is indicated by the light path L1.

Another part of the light incident into the main body portion 62 from the light source 5 is reflected by the reflection portion 65. The light reflected by the reflection portion 65 is emitted from the emitting surface 64 toward the upper side. The light emitted from the emitting surface 64 is indicated by the light path L2.

According to the configuration described above, the light guide body 6 includes the emitting surface 63 through which the light emitted from the light source 5 is emitted to the rear side of the automatic two-wheel vehicle 100, and the emitting surface 64 through which the light emitted from the light source 5 is emitted to the upper side of the automatic two-wheel vehicle 100. The emitting surface 63 is an example of the first region. The emitting surface 64 is an example of the second region. Of the light emitted through the emitting surface 63 and the emitting surface 64, the light emitted to the upper side of the automatic two-wheel vehicle 100 is visually recognized by a vehicle on the rear side. Accordingly, the automatic two-wheel vehicle 100 on which the vehicle lighting device 1 is mounted is more easily recognized visually from a following vehicle that is tall in vehicle height.

For example, there is a case where a distance between the automatic two-wheel vehicle 100 and a following vehicle that is tall in vehicle height such as a large truck is short during traveling of the automatic two-wheel vehicle 100. Since the distance between the automatic two-wheel vehicle 100 and the following vehicle in the case of a vehicle tall in vehicle height such as a large vehicle is short at this time, it may be difficult to see the tail lamps 21L and 21R of the automatic two-wheel vehicle 100 from a driver's seat of the vehicle tall in vehicle height, and it may be difficult for the following vehicle to find the presence of the automatic two-wheel vehicle 100.

When it is difficult to see the automatic two-wheel vehicle 100 from the following vehicle as described, light is caused to be emitted from the emitting surface 64, which is the second region, to the upper side of the automatic two-wheel vehicle 100. Accordingly, the presence of the automatic two-wheel vehicle 100 can be more reliably notified to the driver or the like of the following vehicle.

Further, since the light guide body 6 is used to emit light to the upper side and the rear side of the automatic two-wheel vehicle 100, the vehicle lighting device 1 that is more easily recognized visually from a following vehicle tall in vehicle height can be configured with a simple configuration.

Further, according to the configuration described above, the light guide body 6 includes the reflection portion 65 that reflects the light incident from the light source 5 toward the upper side of the automatic two-wheel vehicle 100. The reflection portion 65 is an example of the step. Since the light guide body 6 includes the reflection portion 65, the vehicle lighting device 1 that is more easily recognized visually from a following vehicle tall in vehicle height can be configured with a simple configuration.

Further, by using the light guide body 6 as described above, it is possible to emit light to the upper side and the rear side of the automatic two-wheel vehicle 100 even if there is one light source.

<Vehicle Lighting Device Having One Light Source Emitting Light to Rear Side of Vehicle and Upper Side of Vehicle>

Next, a vehicle lighting device having one light source that emits light to a rear side of the vehicle and an upper side of the vehicle will be described with reference to FIG. 5. Here, similarly to the example illustrated in FIG. 4, the vehicle is the automatic two-wheel vehicle 100 on which the vehicle lighting device 1 is mounted.

Figure 5:
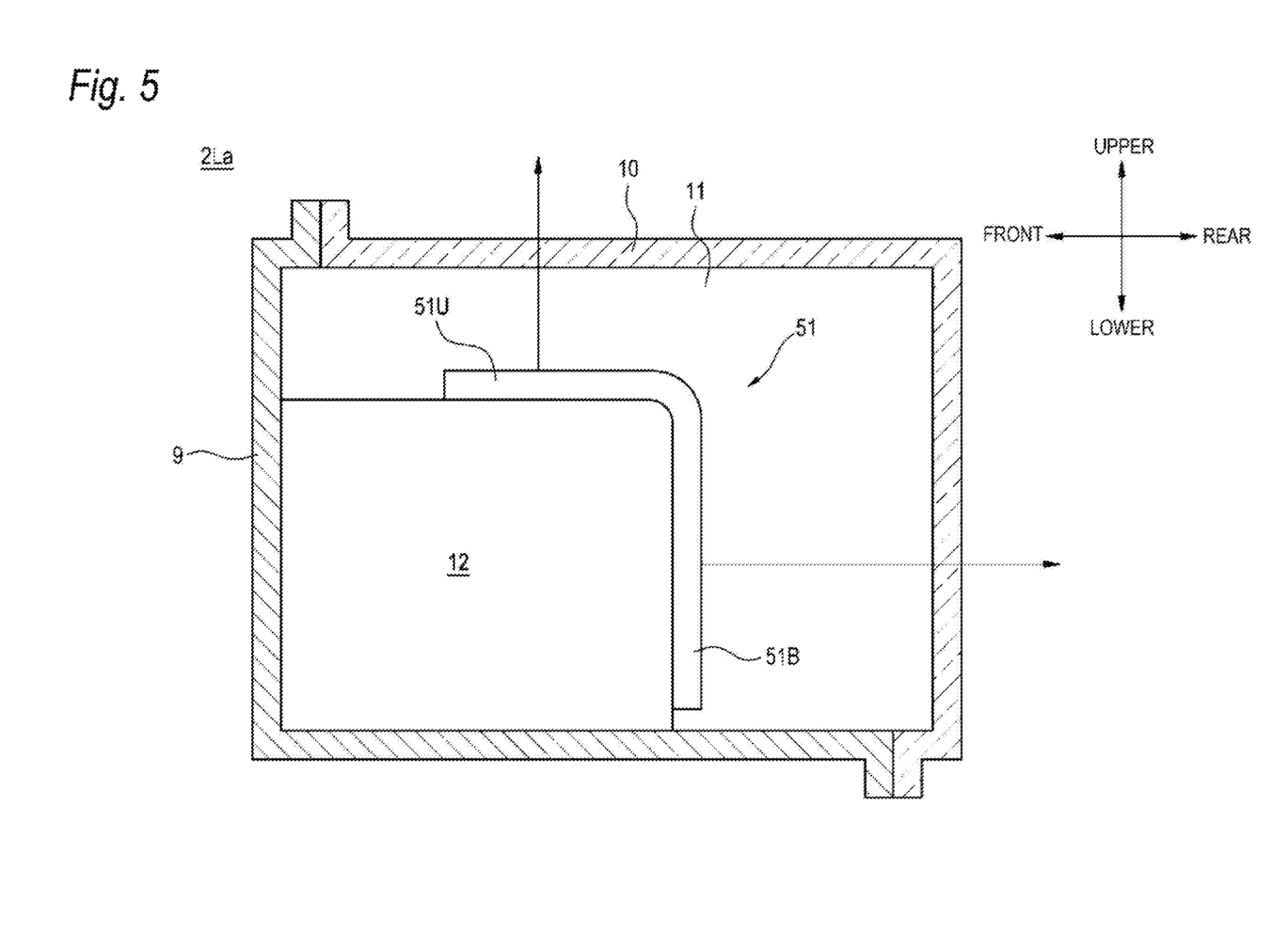
FIG. 5 is a schematic diagram illustrating one planar light source that emits light in a plurality of directions.

A left lighting device unit 2La illustrated in FIG. 5 includes a base portion 12 in the lamp chamber 11. One planar light source 51 bent along the base portion 12 is disposed on the base portion 12. The planar light source 51 includes a rear emitting surface SIB that emits light to the rear side of the vehicle, and an upper emitting surface 51U that emits light to the upper side of the vehicle. The planar light source 51 may be configured with an O-LED or the like in which the rear emitting surface SIB and the upper emitting surface 51U are continuous. The lamp control part 31 is configured to be capable of controlling lighting of the rear emitting surface 51B and lighting of the upper emitting surface 51U separately.

Next, light emission of the left lighting device unit 2La illustrated in FIG. 5 will be described.

The left lighting device unit 2La may be controlled based on signals from the vehicle control part 4, the sensors 7, 24L, and 24R, similarly to the left lighting device unit 2L illustrated in FIG. 4.

The left lighting device unit 2La may be configured such that lighting of the upper emitting surface SU or the rear emitting surface 51B is controlled selectively.

For example, when the sensors 7, 24L, and 24R do not detect information on a following vehicle or the like, the lamp control part 31 may control the planar light source 51 such that only the upper emitting surface 51U is turned off and only the rear emitting surface 51B is turned on.

As described, by turning off only the upper emitting surface 51U, it is possible to reduce power consumption of the vehicle lighting device 1.

The left lighting device unit 2La may be configured such that lighting of the upper emitting surface 51U is performed when the sensor 7 (see FIG. 3), and sensors 24L and 24R detect the following vehicle.

For example, when at least one of the sensors 7, 24L, and 24R detects a vehicle tall in vehicle height such as a large truck approaching from behind the automatic two-wheel vehicle 100, the vehicle control part 4 receives information on approaching of the following vehicle from the sensor control part 32. The vehicle control part 4 having received the information on approaching transmits a control signal to the lamp control part 31. The lamp control part 31 controls lighting of the upper emitting surface 51U of the planar light source 51 based on the control signal received from the vehicle control part 4.

According to this configuration, it is possible to notify the following vehicle detected by at least one of the sensors 7, 24L, and 24R of the presence of the automatic two-wheel vehicle 100 on which the vehicle lighting device 1 is mounted.

According to the configuration described above, since the planar light source 51 includes the upper emitting surface 51U that emits light to the upper side of the vehicle, the light from the planar light source 51 can be emitted to the upper side of the automatic two-wheel vehicle 100, and the vehicle on which the vehicle lighting device is mounted is more easily recognized visually from the following vehicle tall in vehicle height.

<Vehicle Lighting Device Having Plurality of Light Sources Emitting Light to Rear Side of Vehicle and Upper Side of Vehicle>

Next, a vehicle lighting device having a plurality of light sources that emit light to a rear side of the vehicle and to an upper side of the vehicle will be described with reference to FIG. 6. Here, similarly to the example illustrated in FIG. 4, the vehicle is the automatic two-wheel vehicle 100 on which the vehicle lighting device 1 is mounted.

Figure 6:
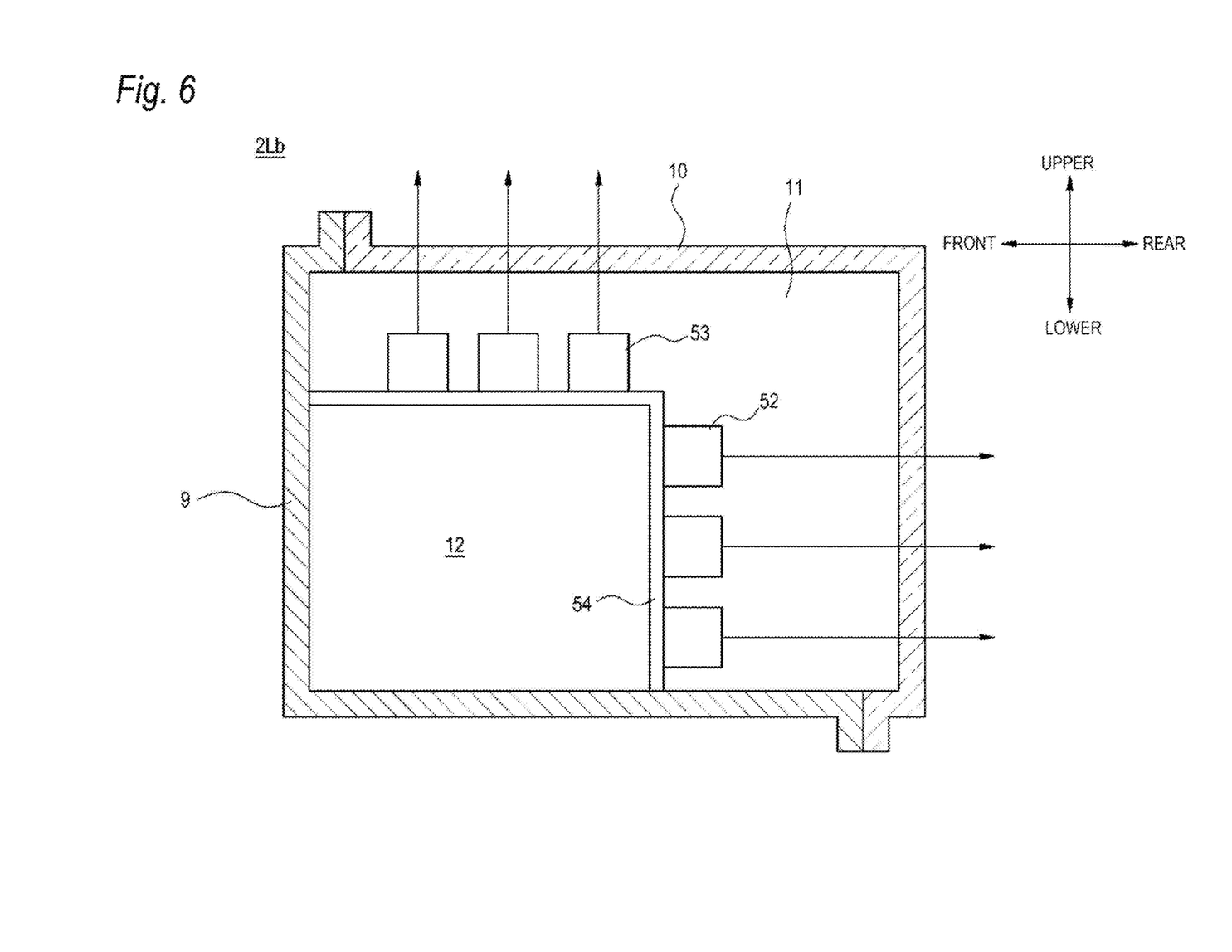
FIG. 6 is a schematic diagram illustrating a plurality of light sources.

A left lighting device unit 2Lb illustrated in FIG. 6 includes a plurality of light sources 52 and 53, as a configuration for emitting light to the rear side of the vehicle and to the upper side of the vehicle.

The plurality of light sources 52 and 53 are disposed on the base portion 12 of the lamp chamber 11. The light source 52, which is a part of the plurality of light sources, is disposed in a direction in which light is emitted to the rear side of the automatic two-wheel vehicle 100. The light source 53, which is at least another part of the plurality of light sources, is disposed in a direction in which light is emitted to the upper side of the automatic two-wheel vehicle 100.

In FIG. 6, the plurality of light sources 52 and 53 are provided on one surface side of, for example, a transparent flexible printed circuit board (FPC) 54. The transparent FPC 54 is disposed on the base portion 12, and the transparent FPC is in a bent state such that the light source 52 faces the rear side and the light source 53 faces the upper side. The lamp control part 31 is connected to the transparent FPC 54, and is configured to be capable of controlling the lighting of the light sources 52 and 53 separately.

By disposing the transparent FPC 54 as described, it is difficult for the transparent FPC 54 to be visually recognized when all of the light sources 52 and 53 are turned off, and it is preferable that the transparent FPC 54 has a neat appearance in design.

Next, light emission of the left lighting device unit 2Lb illustrated in FIG. 6 will be described.

The left lighting device unit 2Lb may be controlled based on signals from the vehicle control part 4, the sensors 7, 24L, and 24R, similarly to the left lighting device unit 2L illustrated in FIG. 4.

The left lighting device unit 2Lb may be configured such that lighting of the light source 52 or the light source 53 is controlled selectively.

For example, when at least one of the sensors 7, 24L, and 24R does not detect information on a following vehicle or the like, the lamp control part 31 may control the light sources 52 and 53 such that only the light source 53 is turned of and only the light source 52 is turned on.

Further, the left lighting device unit 2Lb may be configured such that the lighting of the light source 53 is controlled when at least one of the sensors 7, 24L, and 24R detects a following vehicle. According to this configuration, it is possible to notify the following vehicle detected by at least one of the sensors 7, 24L, and 24R of the presence of the automatic two-wheel vehicle 100 on which the vehicle lighting device 1 is mounted.

According to the configuration described above, the light source is configured with a plurality of light sources 52 and 53. Among the plurality of light sources, a part of the light sources 52 are disposed in the direction in which the light is emitted to the rear side of the vehicle, and among the plurality of light sources, at least a part of the light sources 53 are disposed in the direction in which the light is emitted to the upper side of the vehicle. Therefore, the light is emitted from the light source 53 disposed in the direction in which the light is emitted to the upper side of the vehicle, and the vehicle on which the vehicle lighting device is mounted is more easily recognized visually from the following vehicle tall in vehicle height.

<Vehicle Lighting Device Having Two Planar Light Source Emitting Light to Rear Side of Vehicle and Upper Side of Vehicle>

Next, a vehicle lighting device having two light sources that emit light to a rear side of the vehicle and to an upper side of the vehicle will be described with reference to FIG. 7. Here, similarly to the example illustrated in FIG. 4, the vehicle is the automatic two-wheel vehicle 100 on which the vehicle lighting device 1 is mounted.

Figure 7:
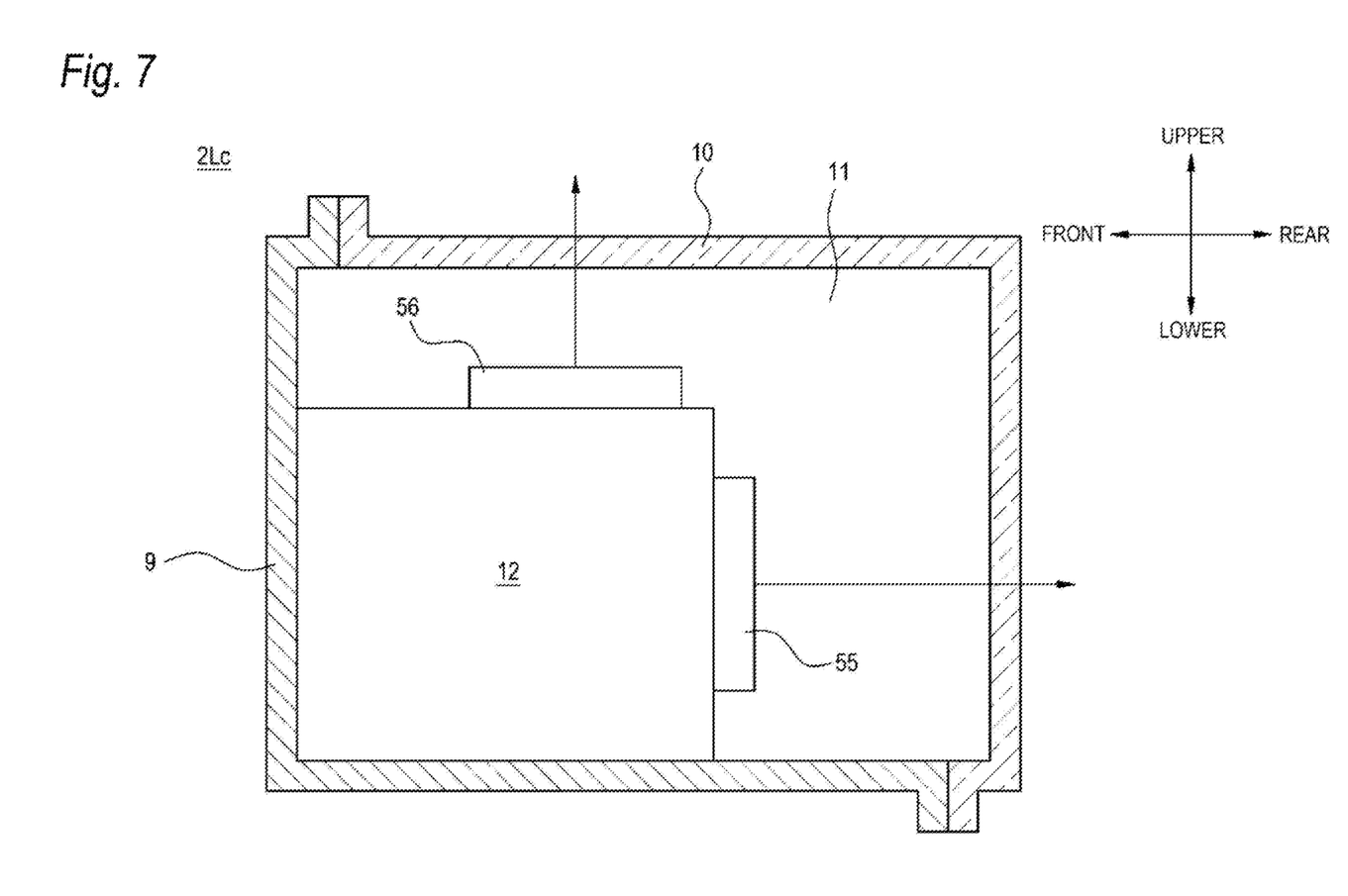
FIG. 7 is a schematic diagram illustrating two planar light sources.

Two planar light sources 55 and 56 illustrated in FIG. 7 are disposed on the base portion 12, respectively. The planar light source 55 is disposed in a direction in which light is emitted to the rear side of the vehicle. The planar light source 56 is disposed in a direction in which light is emitted to the upper side of the vehicle. The lamp control part 31 is configured to be capable of controlling light emission of the planar light sources 55 and 56 separately. The planar light sources 55 and 56 may be configured with an O-LED, or with a plurality of light sources provided on a substrate.

Next, light emission of a left lighting device unit 2Lc illustrated in FIG. 7 will be described.

The left lighting device unit 2Lc may be controlled based on signals from the vehicle control part 4, the sensors 7, 24L, and 24R, similarly to the left lighting device unit 2L illustrated in FIG. 4.

The left lighting device unit 2Lc may be configured such that lighting of the planar light source 55 or the planar light source 56 is controlled selectively.

For example, when the sensors 7, 24L, and 24R do not detect information on a following vehicle or the like, the lamp control part 31 may control the planar light sources 55 and 56 such that only the planar light source 56 is turned off and only the planar light source 55 is turned on.

Further, the left lighting device unit 2Lc may be configured such that the lighting of the planar light source 56 is controlled when at least one of the sensors 7, 24L, and 24R detects a following vehicle. According to this configuration, it is possible to notify the following vehicle detected by at least one of the sensors 7, 24L, and 24R of the presence of the automatic two-wheel vehicle 100 on which the vehicle lighting device 1 is mounted.

According to the configuration described above, since the planar light source 56 disposed in the direction in which the light is emitted to the upper side is provided, the vehicle is more easily recognized visually from a following vehicle tall in vehicle height.

In the left lighting device units 2L, 2La, 2Lb, and 2Lc illustrated in FIGS. 4 to 7, the sensors 24L and 24R (see FIG. 3) are disposed at positions where light emitted to the upper side of the automatic two-wheel vehicle 100 and light emitted to the rear side of the automatic two-wheel vehicle 100 is not blocked.

According to the configuration described above, since the sensors 24L and 24R are disposed at positions where the light emitted to the upper side is not blocked, light emitted to the upper side of the left lighting device units 2L, 2La, 2Lb, and 2Lc is visually recognized from a following vehicle.

The configuration and control, of the light source and the optical member, of the left lighting device units 2L, 2La, 2Lb, and 2Lc are described by taking the tail lamps 21L and 21R as an example in description of FIGS. 3 to 7, and the configuration and control of the back lamps 22L and 22R and of the turn signal lamps 23L and 23R may be adopted.

Further, in the left lighting device units 2L, 21a, 2Lb, and 2Lc illustrated in FIGS. 4 to 7, a diffusion member that diffuses emitted light may be used for the translucent cover 10 serving as an emitting surface. In this way, when the diffusion member is used, it is possible to more efficiently emit light to the rear side and upper side of the automatic two-wheel vehicle 100.

<Cleaner System Using Traveling Wind>

When the automatic two-wheel vehicle 100 is being driven, it is important to maintain cleanliness of the sensors 7 so that sensitivity of the sensors 7 such as LiDAR does not decrease. Therefore, the automatic two-wheel vehicle 100 is provided with a cleaner system.

Referring back to FIG. 3, a cleaner system using a traveling wind will be described as an example of a cleaner system of the sensor 7.

The sensor 7 is disposed at a predetermined distance from the components of the vehicle lighting device 1 excluding the sensor 7. As illustrated in FIG. 3, the left and right lighting device units 2L and 2R and the sensor 7 are disposed with a space therebetween. The left and right lighting device units 2L and 2R illustrated in FIG. 3 are examples of the components of the vehicle lighting device 1. That is, the left and right lighting device units 2L and 2R and the sensor 7 are disposed such that a gap is formed between a right side surface of the left lighting device unit 2L and a left side surface of the sensor 7, and another gap is formed between a left side surface of the right lighting device unit 2R and a right side surface of the sensor 7. With this disposition, gaps are formed between the left lighting device unit 2L and the sensor 7 and between the right lighting device unit 2R and the sensor 7.

As illustrated in FIG. 3, the left and right lighting device units 2L and 2R and the sensor 7 may be disposed such that gaps are provided on an upper side, a lower side, a left side, and a right side of the sensor 7. That is, the sensor 7, and the components of the vehicle lighting device 1 may be disposed such that a gap is formed around the detection surface of the sensor 7. In this example, the detection surface of the sensor 7 is a rear surface of the sensor 7. With the disposition in which a gap is formed around the detection surface of the sensor 7, the components of the vehicle lighting device 1 including the sensor 7 are disposed such that the traveling wind of the automatic two-wheel vehicle 100 passes around the detection surface of the sensor 7.

At the time of traveling of the automatic two-wheel vehicle 100, as illustrated in FIG. 3, a traveling wind 13 passes through the gap between the left lighting device unit 2L and the sensor 7 or the gap between the right lighting device unit 2R and the sensor 7, in a direction opposite to the traveling direction of the automatic two-wheel vehicle 100 at the time of traveling straight ahead. That is, the traveling wind 13 of the automatic two-wheel vehicle 100 passes between the sensor 7 and components excluding the sensor 7, that is, passes around the detection surface of the sensor 7. As illustrated in FIG. 3, the traveling wind 13 passes over the side surfaces of the sensor 7 to form an air curtain.

Similarly, the traveling wind of the vehicle passes through the gaps formed on the upper side, the lower side, the left side, and the right side of the sensor 7. Similarly to the traveling wind 13, the traveling wind passes over the side surfaces including upper, lower, left, and right surfaces of the sensor 7 to form an air curtain.

With the air curtain, the cleaner system prevents dust or dirt from flowing to the detection surface of the sensor 7.

The traveling wind 13 having passed over the side surfaces of the sensor 7 turns into a turbulent flow 14 in the vicinity of the rear surface of the sensor 7. With the turbulent flow 14 moving to stir and change an airflow in the vicinity of the rear surface of the sensor 7, the cleaner system functions to prevent dust or dirt from adhering to the rear surface of the sensor 7, or functions to blow off dust or dirt that has adhered to the rear surface of the sensor 7.

According to the configuration described above, since the components of the vehicle lighting device 1 including the sensor 7 are disposed such that the traveling wind 13 of the automatic two-wheel vehicle 100 passes around the detection surface of the sensor 7, it is possible to prevent dust or dirt from flowing to the detection surface of the sensor.

According to the configuration described above, the sensor 7 is disposed at a predetermined distance from the components excluding the sensor 7. In this example, the components excluding the sensor 7 refer to the left and right lighting device units 2L and 2R. By disposing the sensor 7 at a predetermined distance from the components excluding the sensor 7, the traveling wind 13 of the automatic two-wheel vehicle 100 passes between the sensor 7 and the components excluding the sensor 7, that is, passes around the detection surface of the sensor 7. Accordingly, it is possible to prevent dust or dirt from flowing to the detection surface of the sensor 7.

That is, according to the configuration described above, the traveling wind 13 passes through the gap between the sensor 7 and the left lighting device units 2L and the gap between the sensor 7 and the right lighting device unit 2R as the automatic two-wheel vehicle 100 travels. The left and right lighting device units 2L and 2R are examples of 2 lamps. Since the traveling wind 13 passes through the gap between the left right lighting device unit 2L and the right lighting device unit 2R, it is possible to prevent dust, dirt, and the like from flowing to the detection surface of the sensor 7.

In the example described above, gaps are formed between the left lighting device unit 2L and the sensor 7 and between the right lighting device unit 2R and the sensor 7, and alternatively the sensor 7 may be disposed such that a gap is formed between the sensor 7 and one of the left and right lighting device units 2L and 2R. With this disposition, the traveling wind 13 passes through the gap between the sensor 7 and one of the left and right lighting device units. According to this configuration, it is possible to prevent dust or dirt from flowing to the detection surface of the sensor 7 from the sides where the traveling wind 13 passes over.

Further, in the example described above, it is configured such that the traveling wind 13 passes all of the upper side, the lower side, the left side, and the right side of the sensor 7 as the automatic two-wheel vehicle 100 travels, and alternatively it may be configured such that the traveling wind 13 passes over at least one of the upper side, lower side, left side, and right side of the sensor 7. According to this configuration, it is possible to prevent dust or dirt from flowing to the detection surface of the sensor 7 from the sides where the traveling wind 13 passes over.

The sensors 24L and 24R accommodated in the right and left lighting device units 2L and 2R are disposed such that the traveling wind passes along detection surfaces of the sensors 24L and 24R and passes around the detection surfaces of the sensors 24L and 24R. Accordingly, it is possible to prevent dust, dirt, and the like from flowing to the detection surfaces of the sensors 24L and 24R.

<Cleaner System Using Cleaner Nozzle>

Figure 8:
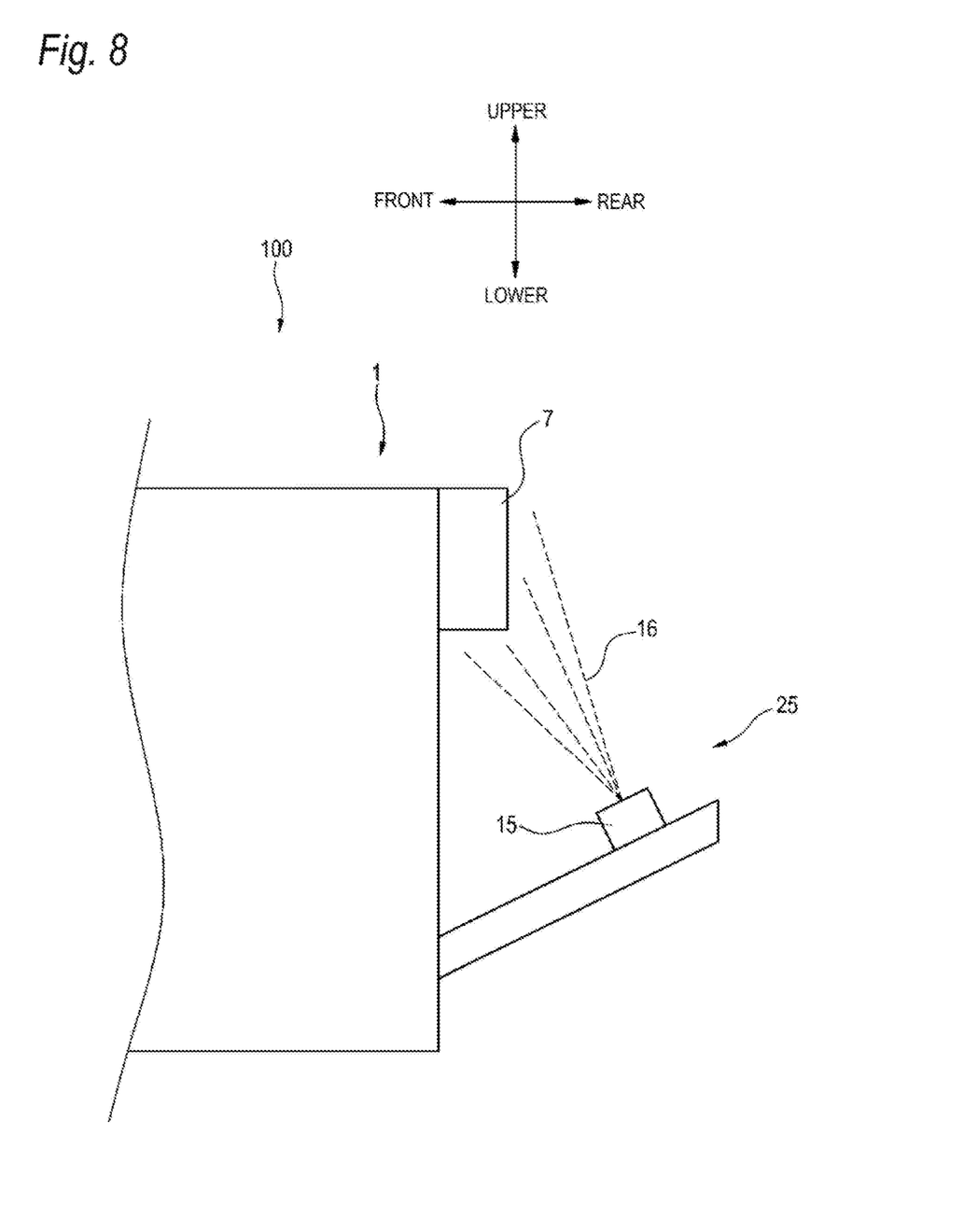
FIG. 8 is a schematic diagram illustrating a cleaner system using a cleaner nozzle.

Next, a cleaner system using a cleaner nozzle will be described with reference to FIGS. 2 and 8. FIG. 8 is a schematic side view illustrating the cleaner system using the cleaner nozzle.

As illustrated in FIG. 2, the vehicle lighting device 1 includes the cleaner system 25. The cleaner system 25 is a system that cleans the sensor 7 provided outside the automatic two-wheel vehicle 100. Here, the sensor 7 is an example of a cleaning target object. That is, the cleaner system using the cleaner nozzle is a system that removes foreign matters such as water droplets, mud, dust, and the like adhered to the cleaning target object by using a cleaning medium. The cleaner system 25 is configured so as to be controlled by a control signal from the cleaner control part 33.

As illustrated in FIG. 8, the cleaner system 25 includes a cleaner nozzle 15. The cleaner nozzle 15 is capable of cleaning the sensor 7 illustrated in FIGS. 3 and 8. The cleaner nozzle 15 is configured to be capable of discharging a cleaning liquid 16 stored in a tank (not illustrated) toward a cleaning target. Here, the cleaning liquid 16 is an example of a cleaning medium. Examples of the cleaning liquid 16 discharged by the cleaner system 25 include air, water, a cleaning liquid containing a detergent, or the like. As a mechanism that supplies the cleaning liquid 16 to the cleaner nozzle 15, various mechanisms such as a pump operated by an actuator can be used.

In the cleaner system 25 described above, input of an activation signal to the cleaner control part 33 is not particularly limited. The input of the activation signal to the cleaner control part 33 may be, for example, a signal that is output from an operation part such as a switch operated by a user. Further, the input of the activation signal to the cleaner control part 33 may be a signal that is output when stain sensors mounted on each part of the automatic two-wheel vehicle 100 detect a stain. Further, the signal that is output when the stain sensors detect a stain may be input to the vehicle control part 4, and a signal for activating the cleaner system 25, which is from the vehicle control part 4, may be input to the cleaner control part 33. The sensors 7, 24L, and 24R accommodated in the vehicle lighting device 1 can also function as a stain sensor.

Next, control of the cleaner system 25 will be described with reference to FIGS. 2 and 8.

When a signal for cleaning the sensor 7 is input to the cleaner control part 33, the cleaner control part 33 supplies the cleaning liquid 16 from a tank (not illustrated) to the cleaner nozzle 15. The cleaner control part 33 activates an actuator (not illustrated) used for the cleaner nozzle 15 to cause the cleaning liquid 16 to be discharged from the cleaner nozzle 15 toward the sensor 7.

According to the configuration described above, since the cleaner nozzle 15 that ejects the cleaning medium to the sensor 7 is provided, the stain on the detection surface of the sensor 7 can be cleaned by the cleaning liquid 16 discharged from the cleaner nozzle 15.

The cleaner nozzle 15 may be configured to be capable of supplying compressed and the cleaning liquid 16. When the cleaning liquid 16 remains on the sensor 7, information on the outside of the automatic two-wheel vehicle 100 may not be appropriately acquired. Therefore, by ejecting compressed air separately from the cleaning liquid 16 to the sensor 7, on which the cleaning liquid 16 tends to remain, it is possible to reliably prevent the cleaning liquid 16 from remaining on the detection surface of the sensor 7.

The sensor 7 such as a LiDAR may include a detection surface and a cover (not illustrated) that covers the detection surface. The cleaner nozzle 15 with which the sensor 7 is cleaned may be configured to clean the detection surface of the sensor 7, or may be configured to clean the cover that covers the sensor 7.

The cleaner system 25 may include a left cleaner system that cleans the sensor 24L and a right cleaner system that cleans the sensor 24R.

<Various Modifications>

Although the embodiments of the invention have been described above, it is needless to say that the technical scope of the invention should not be interpreted as being limited to the description of the present embodiments. It is to be understood by those skilled in the art that the present embodiments are merely examples and that various modifications can be made within the scope of the invention described in the claims. The technical scope of the invention should be determined based on the scope of the invention described in the claims and the scope of equivalents thereof.

This application is based on the Japanese Patent Application (Japanese Patent Application No. 2017-168564) filed on Sep. 1, 2017, the Japanese Patent Application (Japanese Patent Application No. 2017-168565) filed on Sep. 1, 2017, and the Japanese Patent Application (Japanese Patent Application No. 2017-168566) filed on Sep. 1, 2017, the contents of which are incorporated herein by reference.

The invention claimed is:

1. A vehicle lighting device that is to be attached to a vehicle capable of traveling at a corner by tilting a vehicle body toward a turning direction, the vehicle lighting device comprising:
   a right lighting device unit including at least one right lamp and a right sensor configured to detect a surrounding environment at a right-rear periphery of the vehicle;
   a left lighting device unit including at least one left lamp and a left sensor configured to detect a surrounding environment at a left-rear periphery of the vehicle; and
   a sensor configured to detect a surrounding environment behind the vehicle, wherein
   the sensor is disposed between the right lighting device and the left lighting device as viewed from a rear side of the vehicle.

2. The vehicle lighting device according to claim 1, wherein
   the sensor is disposed farther rearward in a rear of the vehicle compared to the left lighting device and the right lighting device.

3. The vehicle lighting device according to claim 1, wherein
   the sensor is disposed such that a traveling wind of the vehicle passes at least one of an upper side, a lower side, a left side, or a right side of the sensor, the upper side, the lower side, the left side, and the right side of the sensor extending in a travelling direction of the vehicle.

4. The vehicle lighting device according to claim 1, wherein
   a gap through which a traveling wind of the vehicle passes is formed between the sensor and at least one of the right light emitting device or the left light emitting device.

5. A vehicle lighting device that is to be attached to a vehicle capable of traveling at a corner by tilting a vehicle body toward a turning direction, wherein
   at least two sensors configured to detect a surrounding environment behind the vehicle are mounted, and
   the at least two sensors are disposed symmetrically with respect to a traveling direction of the vehicle at a time of traveling straight ahead;
   further comprising an optical member that emits light to a rear side and an upper side of the vehicle.

6. The vehicle lighting device according to claim 5, wherein
the sensors are two LiDAR.

7. The vehicle lighting device according to claim 5, wherein
the sensors are two cameras.

8. A vehicle lighting device that is to be attached to a vehicle capable of traveling at a corner by tilting a vehicle body toward a turning direction, the vehicle lighting device comprising:
a sensor configured to detect a surrounding environment behind the vehicle, wherein
components of the vehicle lighting device including the sensor are disposed such that a traveling wind of the vehicle passes the sensor within at least one gap that extends in a travelling direction of the vehicle, the at least one gap is formed by at least one surface of the sensor that extends in a travelling direction of the vehicle.

9. The vehicle lighting device according to claim 8, wherein the sensor is disposed at a predetermined distance from the components other than the sensor.

10. The vehicle lighting device according to claim 8, further comprising:
a cleaner configured to eject a cleaning medium to the detection surface of the sensor.

11. The vehicle lighting device according to claim 5, further comprising:
a right lighting device unit including at least one right lamp and one of the at least two sensors, the one of the at least two sensors configured to detect a surrounding environment at a right-rear periphery of the vehicle; and
a left lighting device unit including at least one left lamp and another of the at least two sensors, the other of the at least two sensors configured to detect a left-rear periphery of the vehicle.

12. The vehicle lighting device according to claim 8, further comprising:
a right lighting device unit including at least one right lamp and a right sensor configured to detect a surrounding environment at a right-rear periphery of the vehicle; and
a left lighting device unit including at least one left lamp and a left sensor configured to detect a surrounding environment at a left-rear periphery of the vehicle; wherein
the sensor is disposed between the right lighting device and the left lighting device as viewed from a rear side of the vehicle; and
the traveling wind of the vehicle passes at a right side surface of the sensor between the right lighting device the sensor and passes at a left side surface of the sensor between the left lighting device and the sensor.

13. The vehicle lighting device according to claim 12, wherein the at least one gap through which the traveling wind of the vehicle passes comprises a first gap and a second gap; the first gap is formed between the sensor and the right light emitting device, and the second gap is formed between the sensor and the left light emitting device.

14. The vehicle lighting device according to claim 1, further comprising:
an optical member that emits light to a rear side and an upper side of the vehicle.

15. The vehicle lighting device according to claim 5, wherein
directions of the at least two sensors in the rear portion of the vehicle are set such that detection ranges of the at least two sensors overlap.

16. The vehicle lighting device according to claim 5, wherein
detection ranges of the at least two sensors are set symmetrically, and
the detection ranges of the at least two sensors are set to overlap each other by 120 degrees in the rear portion of the vehicle.

17. The vehicle lighting device according to claim 8, further comprising:
an optical member that emits light to a rear side and an upper side of the vehicle.

* * * * *